(12) United States Patent
Lawrence et al.

(10) Patent No.: US 8,325,177 B2
(45) Date of Patent: Dec. 4, 2012

(54) LEVERAGING GRAPHICS PROCESSORS TO OPTIMIZE RENDERING 2-D OBJECTS

(75) Inventors: Mark Lawrence, Bainbridge Island, WA (US); Alexander Stevenson, Boston, MA (US); Jason Hartman, Woodinville, WA (US); Brett Bloomquist, Kirkland, WA (US); Robert Brown, Bellevue, WA (US); Chris Kam Ming Chui, Bellevue, WA (US); Samrach Tun, Lynnwood, WA (US); Anthony Hodsdon, Seattle, WA (US); Thomas Olsen, Redmond, WA (US); Miles Cohen, Seattle, WA (US); Ben Constable, Redmond, WA (US); Bilgem Cakir, Redmond, WA (US); Chris Raubacher, Redmond, WA (US); Gerhard Schneider, Seattle, WA (US); Andrew Precious, Duvall, WA (US); Thomas Mulcahy, Seattle, WA (US); Kanwal Vedbrat, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

(21) Appl. No.: 12/345,064

(22) Filed: Dec. 29, 2008

(65) Prior Publication Data
US 2010/0164983 A1 Jul. 1, 2010

(51) Int. Cl.
*G06F 17/00* (2006.01)
(52) U.S. Cl. ......... 345/418; 345/423; 345/619; 345/501
(58) Field of Classification Search .................. 345/423
See application file for complete search history.

(56) References Cited

U.S. PATENT DOCUMENTS

| | | |
|---|---|---|
| 6,894,695 B2 | 5/2005 | vanWelzen |
| 7,142,220 B2 | 11/2006 | Platt |
| 7,154,507 B1 | 12/2006 | Moreton |
| 2005/0140692 A1 | 6/2005 | Swedberg et al. |
| 2005/0179691 A1 | 8/2005 | Johnson |
| 2006/0082593 A1 | 4/2006 | Stevenson |
| 2007/0153004 A1 | 7/2007 | Airey |
| 2007/0257935 A1 | 11/2007 | Koduri |
| 2008/0018652 A1 | 1/2008 | Toelle et al. |

OTHER PUBLICATIONS

The SVGL Toolkit: Enabling Fast Rendering of Rich 2D Graphics http://www.lri.fr/~fekete/ps/svgl.pdf.
GDI+: Next-Generation Graphics Device Interface http://www.microsoft.com/whdc/archive/GDInext.mspx, Mar. 10, 1999.
Why Pixomatic? http://www.radgametools.com/pixowhy.htm, Oct. 1, 2008.
Advanced Graphics http://www.qnx.com/products/middleware/graphics/adv_graphics.html.

*Primary Examiner* — Michelle L Sams
(74) *Attorney, Agent, or Firm* — Shook, Hardy & Bacon L.L.P.

(57) ABSTRACT

Methods and computer-readable media for displaying two-dimensional objects on a display device are disclosed. Rendering requests are received from an application to render two-dimensionally modeled graphics to a display device. Primitive geometries of drawing calls of the rendering requests are tessellated into sequences of triangles. The vertices of the triangles are mapped to a vertex buffer along with an index to identify associated constant data. Batching operations store and communicate calls and mapped data to a graphics processing unit by way of a three-dimensional rendering application program interface. Constant data associated with the mapped data are indexed and appended together in a constant buffer, thereby allowing drawing calls to be coalesced. A staging buffer and a staging texture are provided for batching text anti-aliasing operations. Shader fragments are precompiled and organized by way of a predetermined lookup table.

18 Claims, 9 Drawing Sheets

LEVERAGING GRAPHICS PROCESSORS TO OPTIMIZE RENDERING 2-D OBJECTS

SUMMARY

Two-dimensional objects include graphics ranging from icons to windows and a great deal in between (pictures, photos, presentations, multimedia, and the like). Historically, graphics processing units ("GPUs") have been leveraged to increase performance associated with rendering three-dimensional ("3-D") objects, but not two-dimensional ("2-D") objects. Thus, the processing power of GPUs is often underutilized in connection with 2-D rendering, which either taxes the CPU heavily or results in slower performance, especially as modern applications seek to present a great deal of information on display devices.

Embodiments of the present invention generally relate to computer-readable media having instructions that perform a method of displaying two-dimensional objects on a display device. In some embodiments, a request to render graphics is received from a 2-D application. The rendering request includes calls for drawing 2-D graphics made up of primitive geometries. The calls may be stored in an intermediate buffer. The primitive geometries are tessellated into a sequence of triangles. The vertices of the triangles are mapped into a vertex buffer along with an index indicator associated with constant data for each triangle. An indexed constant buffer is provided and constant data for the triangles are appended together and stored therein. Precompiled shader assemblies are located through a precomputed lookup table and are provided to a three-dimensional ("3-D") rendering application program interface ("API") for generating vertex and pixel shaders. The drawing calls in the intermediate buffer and data mapped to the vertex buffer are communicated in batches to the GPU via the 3-D rendering API for processing.

In some embodiments, calls to render anti-aliased text are also received from a 2-D application. The calls to render anti-aliased text are stored in a staging buffer. A staging texture is provided in which staging operations for anti-aliasing text are carried out. A rectangular portion of the staging texture is allocated to the content of each rendering call. The content of each rendering call is drawn in a respective rectangular portion of the staging texture. The rectangular portions are aligned in rows in an X-direction that are offset in a Y-direction by the largest Y extent of the portions in each row. Staging operations are executed on the staging textures in batch. The content is stored in a parallel queue and associated blending commands are stored in an intermediate buffer for later processing by the GPU.

This Summary was provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWING

Illustrative embodiments of the invention are described in detail below with reference to the attached drawing figures, wherein.

DETAILED DESCRIPTION

Figure 1:
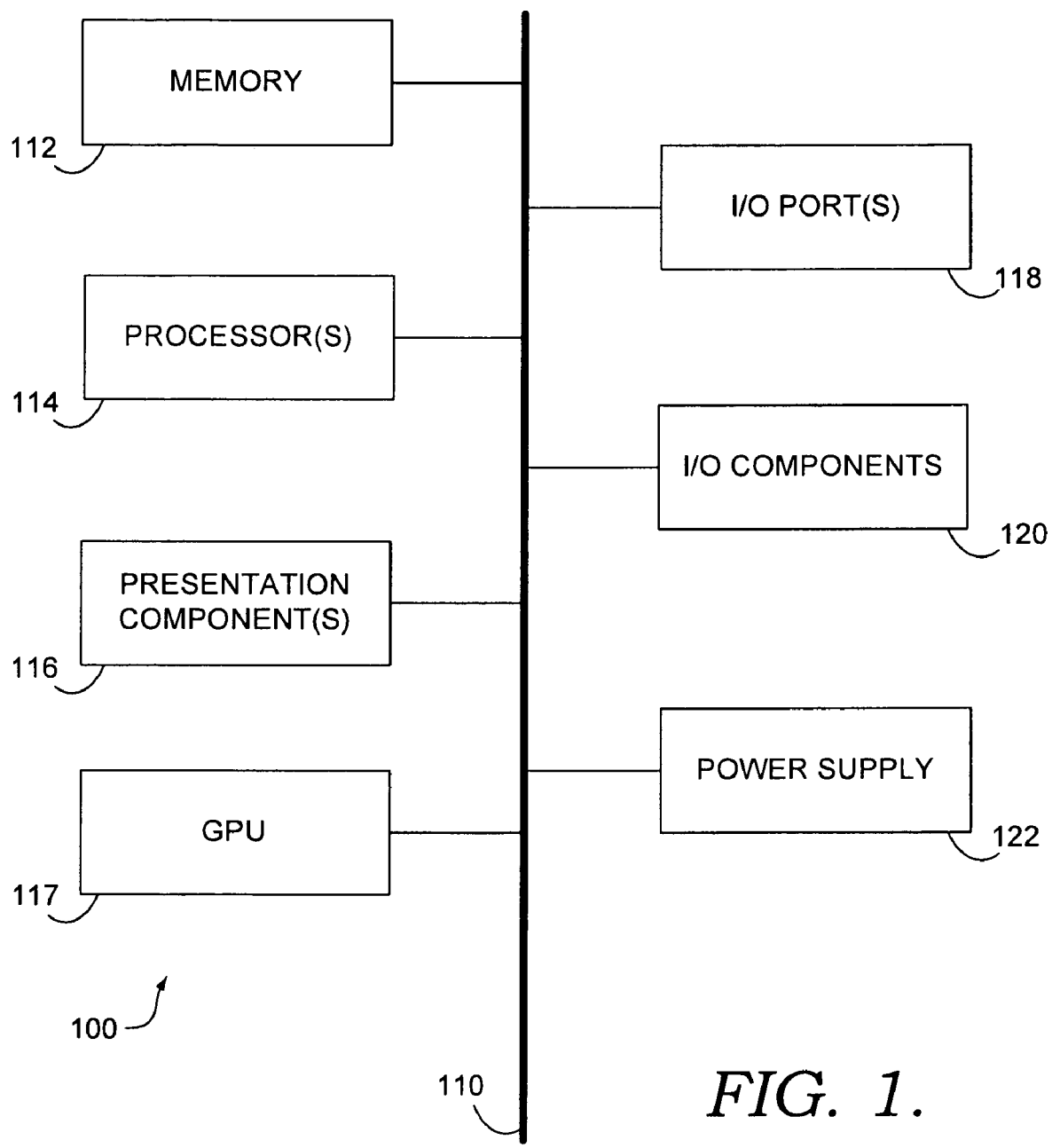
FIG. 1 is a block diagram of an exemplary computing environment suitable for use in implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Generally, this disclosure describes ways of facilitating the display of two-dimensional ("2-D") objects on a display device. A rendering request is received from an application in one embodiment, and the request includes a set of drawing calls and state setting calls that is used to draw a 2-D drawing that includes a set of primitive geometries ("geometries"), which is made of relatively more complex geometries and relatively less complex geometries. The relatively more complex geometries are relatively more complex than the relatively less complex geometries. The drawing calls and state setting calls are coalesced in an intermediate buffer associated with a render target.

The primitive geometries are tessellated into sets of triangles by breaking down a portion of the relatively more complex geometries into a sequence of corresponding triangles. The sequence of corresponding triangles is mapped into a vertex buffer, thereby producing mapped data. The sequence of corresponding triangles is mapped to the vertex buffer as vertices, and an index is associated with each vertex. Thereby, constant data in a constant buffer may be identified. The constant data is indexed to derived indexed constant data. The indexed data are stored in an indexed constant buffer.

The calls in the intermediate buffer are communicated to a graphics processing unit ("GPU") via a three-dimensional rendering application program interface ("3-D rendering API"). The calls are processed using the mapped data and constant buffer, thereby displaying the two-dimensional drawing on the display device.

In another embodiment, a method of displaying two-dimensional objects on a display device is depicted. A set of rendering requests is received from an application. The rendering requests include calls to draw anti-aliased text. The calls are stored in a staging buffer. A staging texture is provided in which staging operations for anti-aliasing text are executed. A rectangular portion of the staging texture is allocated to the content of each of the calls. The content of each of the calls is drawn in a respective rectangular portion of the staging texture.

The rectangular portions of the staging texture are aligned in rows along an X direction and are offset in a Y direction by the greatest Y extent of the portions in each row. The staging texture is communicated to a parallel queue. The content of the staging texture is prepared in batch by executing staging operations. Blending calls for each of the calls to render anti-aliased text are communicated to an intermediate buffer. Data stored in the intermediate buffer and the parallel queue are communicated to a graphics processing unit via a 3-D rendering API. The content of the parallel queue is processed by rendering the content to a render target and blending the content with graphics generated by processing drawing calls in the intermediate buffer, thereby displaying the two-dimensional drawing on the display device.

In another embodiment, a method of displaying two-dimensional objects on a display device is depicted. Rendering requests are received from an application. The rendering requests include drawing calls, state setting calls, and text rendering calls that will be used to draw one or more two-dimensional drawings that include a set of primitive geometries ("geometries"). The set of geometries is made of relatively more complex geometries and relatively less complex geometries. The relatively more complex geometries are relatively more complex than the relatively less complex geometries. Drawing calls and state setting calls are coalesced in an intermediate buffer associated with a render target. The set of primitive geometries are tessellated into a set of triangles by breaking down at least a portion of the relatively more complex geometries into a sequence of corresponding triangles. The sequence of corresponding triangles is mapped into a vertex buffer, thereby producing mapped data. The sequence of corresponding triangles is mapped to the vertex buffer as vertices, and an index is associated with each of the vertices, thereby enabling constant data in a constant buffer to be identified. The constant data are indexed to derived indexed constant data and are stored in an indexed constant buffer. The content of the text rendering calls is anti-aliased in batch, calls to blend the text are added to the intermediate buffer, and staging textures containing the anti-aliased text are mapped to a parallel queue. Shader assemblies are provided to a 3-D rendering API, thereby generating one or more vertex shaders and one or more pixel shaders. Calls in the intermediate buffer are communicated to a GPU via the 3-D rendering API, wherein the calls are processed using the vertex buffer, constant buffer, parallel queue, and the vertex shaders and pixel shaders. Thereby the product of the two-dimensional rendering requests is rendered to the render target.

Referring initially to FIG. 1, an exemplary operating environment for implementing an embodiment of the present invention is shown and designated generally as computing device 100, which can be used in connection with program modules including routines, programs, objects, components, data structures, etc., which generally refer to instructions that perform particular tasks.

FIG. 1 depicts a computing device 100 that includes a bus 110 that directly or indirectly couples the following devices: memory 112, one or more processors 114, one or more presentation components 116, input/output ports 118, one or more GPUs 117, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. In addition, GPUs can have their own internal busses and independent memory to the main system memory. Such is the nature of the art.

The computing device 100 typically includes or can operate with a variety of computer-readable media. By way of example, computer-readable media may includes Random Access Memory ("RAM"); Read Only Memory ("ROM"); Electronically Erasable Programmable Read Only Memory ("EEPROM"); flash memory or other memory technologies; Compact Disc Read-Only Memory ("CDROM"), Digital Versatile Disks ("DVD") or other optical or holographic media; magnetic cassettes, magnetic tape, magnetic disk storage or other magnetic storage devices, or any other medium that can be used to encode desired information and be accessed by computing device 100.

The memory 112 includes computer-readable media in the form of volatile and/or nonvolatile memory. The memory 112 may be removable, nonremovable, or a combination thereof. Exemplary hardware devices include solid-state memory, hard drives, optical-disc drives, etc. The computing device 100 includes one or more processors that read data from various entities such as the memory 112 or I/O components 120. Presentation component(s) 116 present data indications to a user or other device. Exemplary presentation components 116 include a display device, speaker, printing component, vibrating component, etc.

The GPU 117 is typically dedicated to processing and rendering data related to graphics, but can be manipulated to process other data and command types. GPUs 117 are often integrated into, or installed on a presentation component 116, such as a video card, or are integrated into, or installed on a motherboard, main circuit board, or logic board of the computing device 100. In an embodiment, the central processing unit, ("CPU") provides the functions of a GPU 117 for the computing device 100.

I/O ports 118 allow the computing device 100 to be logically coupled to other devices including I/O components 120, some of which may be built in. Illustrative components include a microphone, joystick, game pad, satellite dish, scanner, printer, wireless device, etc.

Figure 2:
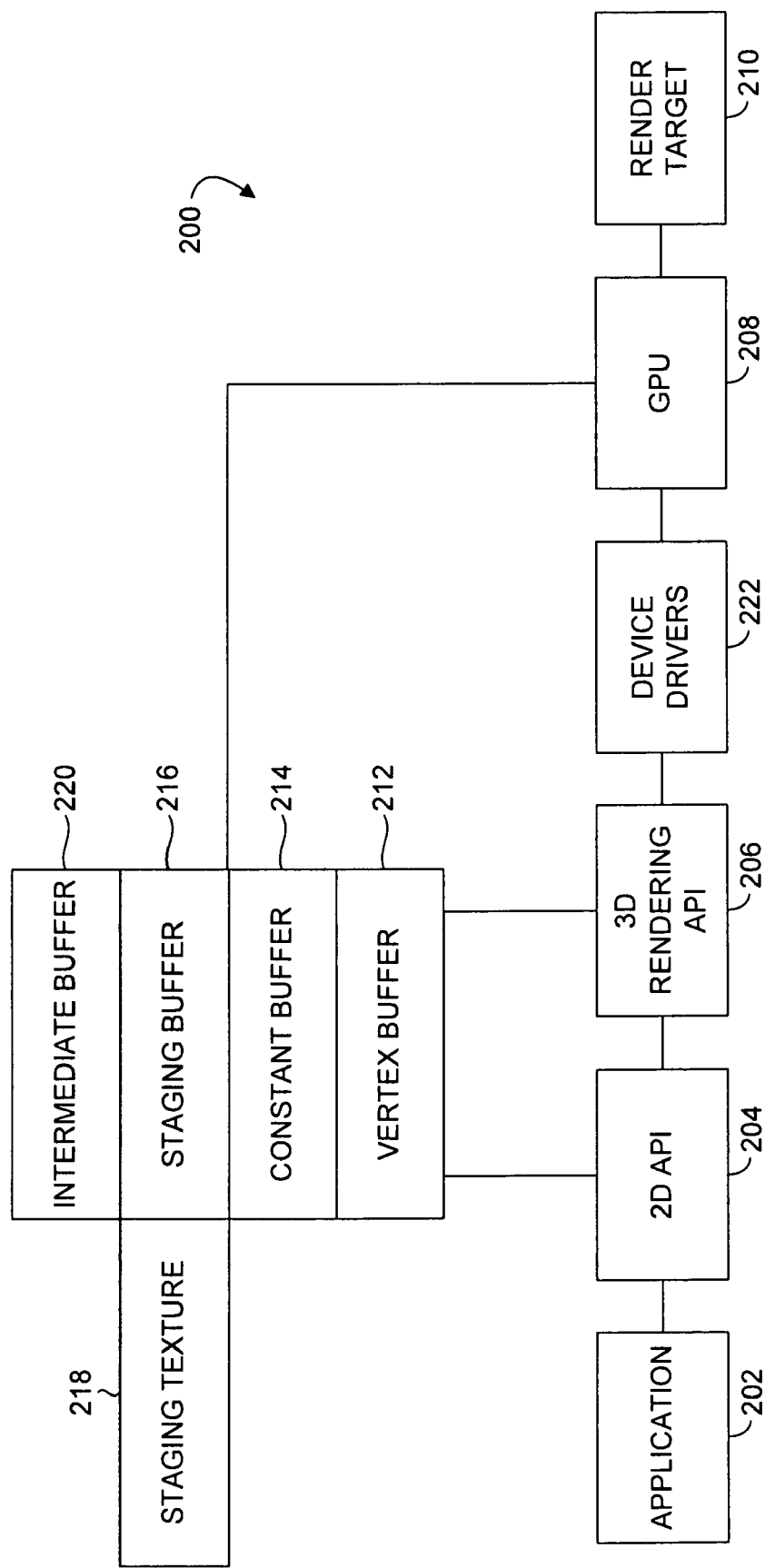
FIG. 2 is a block diagram depicting components of an illustrative graphics processing computing environment suitable for use in implementing embodiments of the invention.

FIG. 2 presents a block diagram that depicts components of an illustrative graphics processing computing environment 200 that is suitable for use in implementing embodiments of the invention. The environment 200 may include an application 202, a two-dimensional application program interface ("2D API") 204, a three-dimensional rendering application program interface ("3-D rendering API") 206, a graphics processing unit ("GPU") 208, and a render target 210. Other components, applications, hardware, and memory resources may be employed in environment 200 without departing from the scope of the invention. The application 202 may include any computer program that might require rendering one or more two-dimensional ("2-D") graphics. The 2-D graphics might be used for presentation of a user interface ("UI") to a user, displaying objects or images to a user on a display, for use by another application, or for any other presentation of graphics and images at a presentation component, such as presentation component 116. For example, the application 202 may be a word processor, spreadsheet program, database program, game, drawing program, or photo-editing program, among a wide variety of other programs.

2-D graphics may be described as images that are to be displayed in two dimensions. Often, 2-D graphics are based on two-dimensional models and are described by a two coordinate system. Computer applications, such as application 202, often describe 2-D graphics in terms of arcs, curves, and lines with one or more colors, fills, surfaces, and transformations applied thereto. 2-D graphics are also expressible as geometric models, vector graphics, digital images, raster graphics, and text.

Conversely, three-dimensional ("3-D") graphics, as discussed below, describe images constructed from three-dimensional models described in a three-coordinate system to produce a two-dimensional image. 3-D graphics are often processed as series of triangles and the vertices thereof, with one or more colors, fills, textures, and transformations applied thereto. Vector graphics, and wire-frame models, among others, may also be used to express 3-D graphics. Various methods for simulating light and its interactions with objects in a graphic can be used to simulate a 3-D appearance.

Additionally, there is a gray area in which the distinction between 2-D and 3-D graphics is somewhat blurred. For example, a street map rendered as a 2-D aerial view would be considered a 2-D graphic. A transformation of that map graphic such as by tilting the plane of the map to create the appearance of the map extending into the screen and away from a user might be referred to by one of skill in the art as a 2.5-D graphic. Such a graphic might not be considered a 3-D graphic because it is based on the original 2-D map graphic which is modeled in 2-D and based on a two-coordinate system even though the graphic has undergone a transformation to provide a 3-D appearance and utilize a three-coordinate system. In other words, the map graphic was first rendered to a surface (render target) and then the surface was transformed as a plane.

The 2D API 204 provides an interface for an application 202 to utilize a GPU 208 to process graphics required by the application. The 2D API 204 is configured to receive 2-D graphics rendering requests and to translate those requests such that the requests can be consumed by a 3-D rendering API 206 (described more fully below). In one embodiment, the 2D API 204 produces and employs one or more buffers, textures, and render targets to aid the translation and processing of the 2-D rendering requests.

Exemplary buffers and textures can include a vertex buffer 212, a constant buffer 214, a staging buffer 216, a staging texture 218, and an intermediate buffer 220. These buffers 212, 214, 216, and 220, and staging textures 218 include memory allocations and computer objects used by the 2D API 204 and other components of environment 200 and are described in greater detail below in one embodiment. Other buffers, textures, and render targets may be created and employed where necessary for the operations of the 2D API 204 and environment 200.

The 3-D rendering API 206 can include any computer application or program configured to receive 3-D graphics rendering requests and facilitate processing of those rendering requests by a GPU 208. Direct3D® from Microsoft Corporation® and Open Graphics Library (OpenGL®) from Silicon Graphics, Inc.® are examples of applications suitable for use as the 3-D API 206 in embodiments of the invention. The 3-D API 206 employs one or more device drivers 222 to allow the 3-D API 206 to translate and provide commands to the GPU 208. The device drivers 222 can be any drivers compatible with the GPU 208 and a host operating system and the environment 200.

The GPU 208 is a graphics processing unit that is compatible with environment 200 and the computing device, such as computing device 100. The GPU 208 is configured to enable processing of 3-D graphics rendering requests and to render graphics to a render target 210. Render target 210 includes a target in computer memory, a display device buffer, or a display device at which the GPU 208 renders the 3-D graphics of associated rendering requests for display or for storage in one embodiment.

Figure 3:
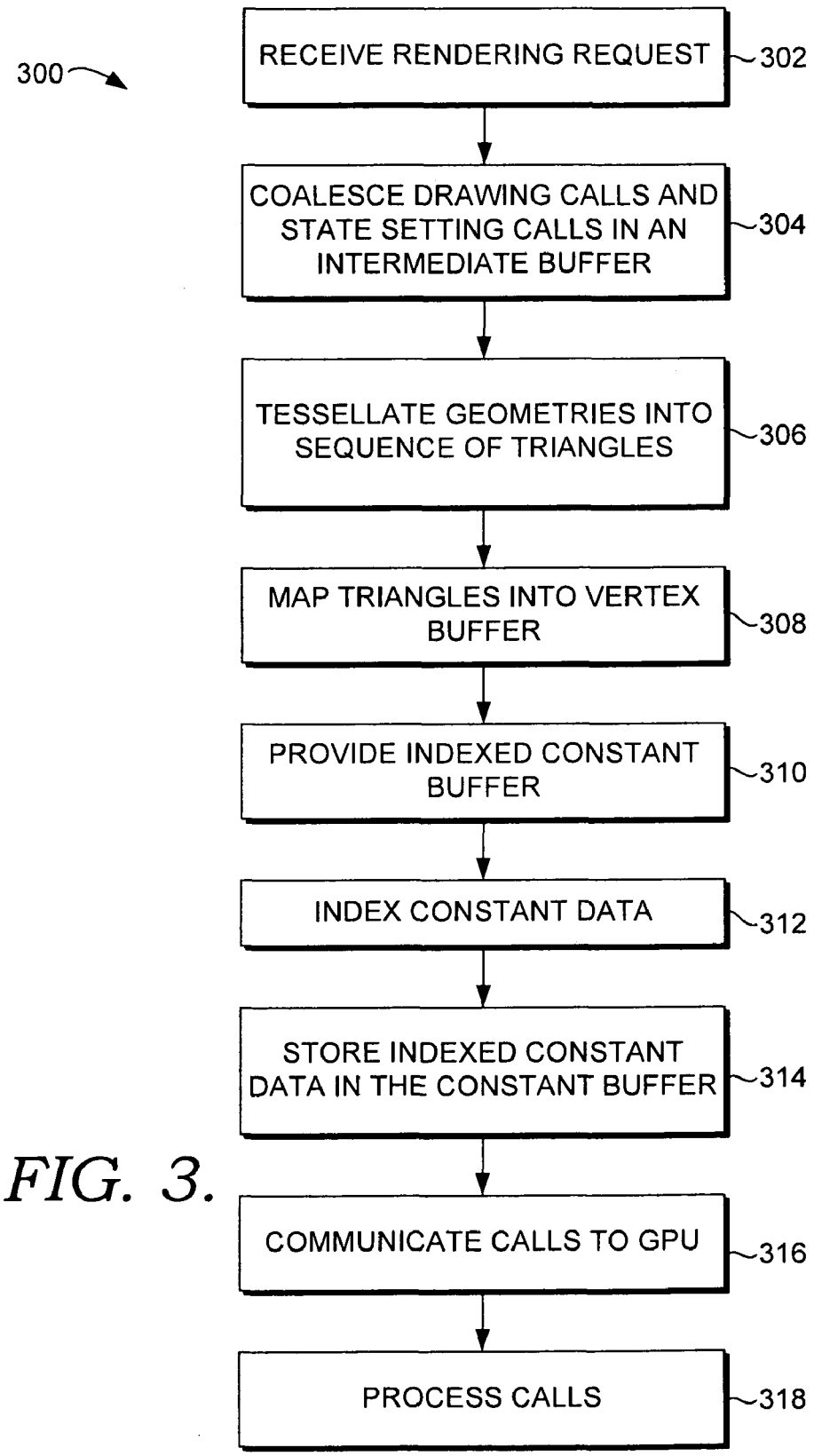
FIG. 3 is a flow diagram depicting a method of displaying two-dimensional objects on a display device according to embodiments of the invention.

With reference now to FIG. 3, a flow diagram depicting a method 300 of displaying two-dimensional objects on a display device according to embodiments of the invention is described. Initially, one or more rendering requests are received from an application, such as application 202 at an interfacing program, such as 2D API 204, as shown at 302. The rendering requests include various drawing and state setting calls for drawing graphics to a render target as well as other rendering operations. The calls might include drawing calls for drawing primitive geometries including arcs, curves, lines, and shapes with associated colors, surfaces, and transformations, among other drawing functions. The geometries generally include complex shapes such as polygons, arcs, and circles or more simple shapes such as rectangles.

One or more drawing calls and state setting calls of the rendering requests are coalesced in an intermediate buffer, at 304. In embodiments, the drawing calls and state setting calls are placed into an intermediate buffer for delayed processing in batch to reduce the frequency of render target and vertex buffer changes as well as to allow coalescing of drawing calls. For example, when the application issues a draw call, rather than setting a render target and processing the draw call immediately, the draw call and any associated parameters are stored together in the intermediate buffer for delayed processing. Other drawing calls and state setting calls to the same render target may be stored in the intermediate buffer as well. The content of the intermediate buffer is not communicated for processing until the buffer is full, a flush command is received, or all drawing calls and state setting calls for the rendering request have been stored in the intermediate buffer. When the content is communicated, it is communicated in batch such that all of the calls and operations therein are processed by the GPU as a group. The GPU may process the calls sequentially or may process two or more calls simultaneously where such capabilities are available.

By batching drawing calls and state setting calls, graphics processing performance may be increased. In embodiments, performance increases result from reducing the number of state changes at the GPU through grouping and coalescing the drawing calls and state setting calls in the intermediate buffer. Additionally, the amount of time required for accessing memory to obtain and execute the calls is decreased by localizing the data in the intermediate buffer.

Where one or more rendering requests are received for rendering graphics to more than one render target, the drawing calls and state setting calls for each render target may be stored in separate intermediate buffers associated with each render target. Thereby, the calls associated with each render target are processed by the 3-D rendering API and the GPU as separate batches. Such a method reduces the number of times render targets must be changed for processing and rendering to multiple render targets. Changing render targets can be deleterious to graphics processing performance and thus, decreasing the frequency of render target changes provides performance gains.

Figure 4A:
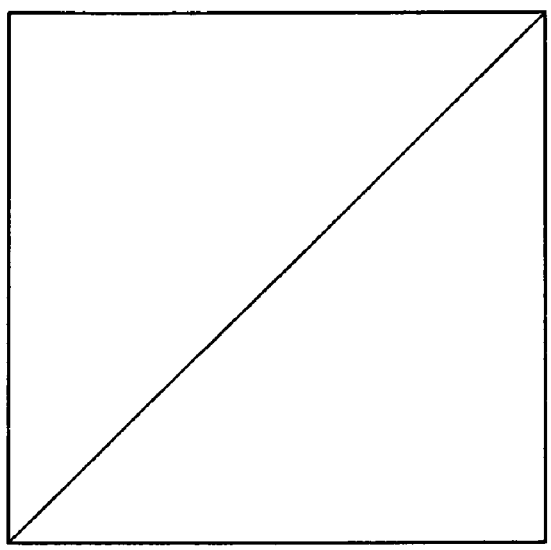
FIGS. 4A and B are illustrative drawings depicting a tessellated square and a tessellated circle, respectively, according to embodiments of the invention.
Figure 4B:
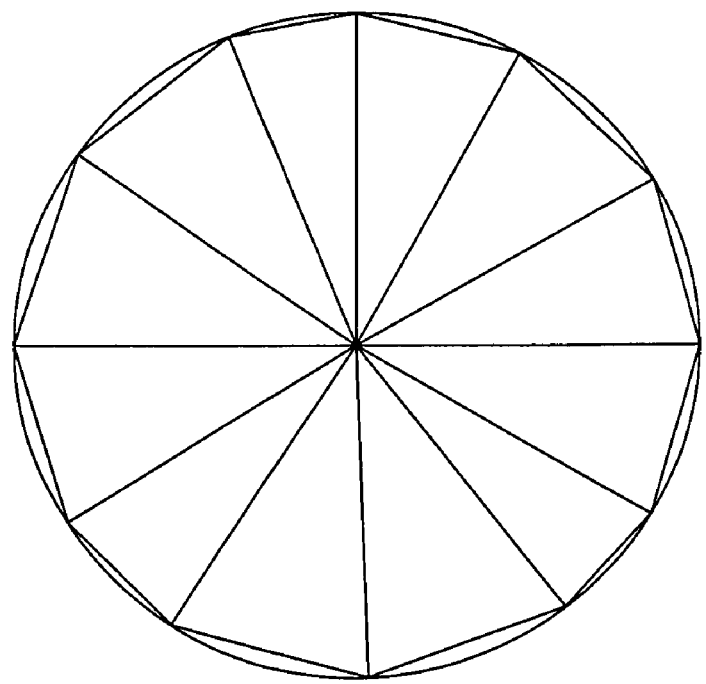

At 306, the primitive geometries of the drawing calls are broken down into one or more series of triangles through tessellation. Tessellation, also known as triangulation, is a process known in the art in which more complex shapes or geometries are broken down or divided into one or more smaller, less complex shapes. For example, as shown in FIGS. 4A and B respectively, a square shape can be tessellated into two smaller triangles, or a circle might be tessellated into a set of smaller triangles that fill the interior and approximate the curved perimeter. Tessellation of the geometries of the 2-D rendering calls allows the expression of the geometries to be translated from the arcs, curves, lines, and shapes expressed by the 2-D application to triangles which can be understood by a 3-D rendering API.

The vertices of the triangles that result from tessellation of the geometries are mapped into or stored in a vertex buffer, such as vertex buffer 212 to produce mapped data, at 308. The vertices are mapped to the vertex buffer by any suitable method. In embodiments, the mapped data includes the coordinates and an alpha value for each vertex. The coordinates are designated based on a coordinate system, e.g., a device-specific coordinate system, a nondevice specific coordinate system, or a floating coordinate system. The alpha value designates an opacity value for the vertex.

An index value is also recorded with each vertex. The index value can be any value that identifies constant data that is stored in a constant buffer. Constant data can include or identify any resources necessary to render a vertex, or the triangle of which the vertex is a part. Such resources include colors, textures, transforms, or other operations to be applied to the vertex or triangle. A constant buffer, such as the constant buffer 214, in which the constant data is stored is provided, at 310. The constant data are indexed to enable identification and association with the mapped data by the index, at 312. In embodiments, indexing constant data allows multiple groups of constant data to be appended together. The indexed constant data are stored in the constant buffer at 314.

By indexing constant data and appending groups of constant data together in a constant buffer, drawing calls can be coalesced together. Typically, in the absence of the indexed constant buffer, the constant buffer must be modified every time the constant data for subsequent drawing calls changes. For example, if a first drawing call drew a red rectangle where the color red was stored as a constant for the drawing call, and a second drawing call needed to draw a green rectangle, the constant buffer containing constant data for the color red would have to be changed to remove the color red and change it to insert the color green. By indexing the constant buffer constants for both red and green can be appended together and stored in the constant buffer. Thus, when drawing the first rectangle the index stored with the vertices for the rectangle in the vertex buffer can be read, and the constant data for the color red might be found. The second rectangle can be similarly drawn and the constant data for the color green found without modifying the constant buffer. One of skill in the art will recognize that modifying the state on the constant buffer and the GPU can be detrimental to performance thereof.

Further, by indexing the constant buffer data, a set of drawing calls can be coalesced into a single drawing call, as described above. The index with each vertex stored in the vertex buffer indicates the respective constant data for each vertex. Thus, separate drawing calls are not necessary to change the constant buffer and to indicate appropriate constant data. Therefore, a single draw call can be used to draw a set of triangles whose vertices are stored in the vertex buffer. In some embodiments, coalescing a set of drawing calls uses blend modes, textures, and shaders that are constant for each of the coalesced drawing calls. The set of drawing calls can be sorted by blend modes, textures, and/or shaders to enable coalescing of groups of drawing calls.

At 316, the mapped data is communicated to the GPU in batch, and at 318 the mapped data is processed and rendered to the render target. In one embodiment, the batch of data mapped to the vertex buffer includes vertices and data for many primitives. The vertex buffer data only need be flushed or communicated to the GPU when the vertex buffer is full, a command to flush is received, or if all data for a rendering request is in the vertex buffer. Thus, the GPU may render many primitives in a single batch and for a single mapping/unmapping of the vertex buffer. Such a process provides performance gains by decreasing the number of times the vertex buffer is mapped/unmapped. Further, coalescing many of the drawing calls through use of the indexed constant buffer, as described above, may further increase the speed at which the rendering requests is processed.

Figure 5:
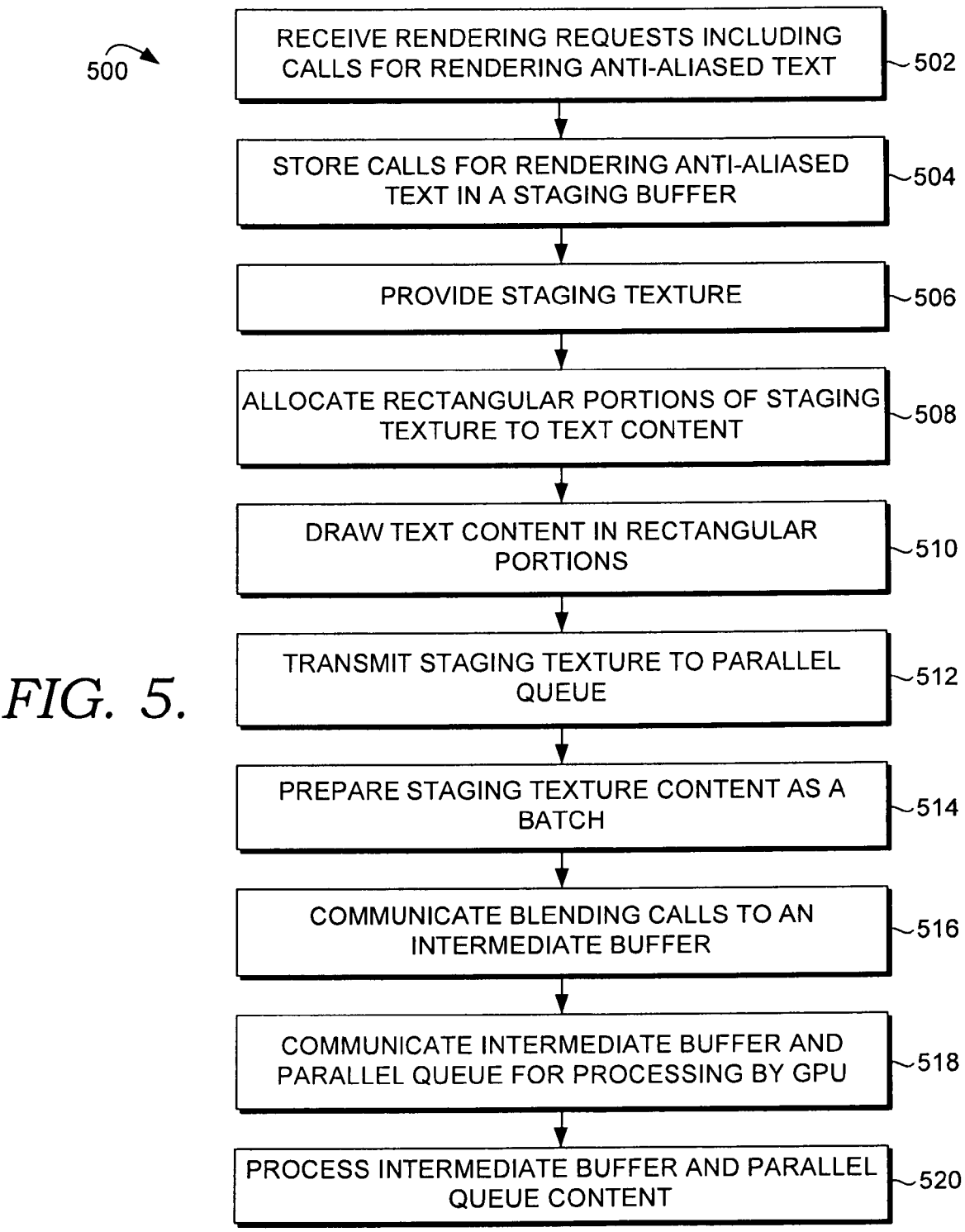
FIG. 5 is a flow diagram depicting a method of displaying two-dimensional objects on a display device according to an embodiment of the invention.

Referring now to FIG. 5, a flow diagram depicting a method 500 of displaying two-dimensional objects on a display device according to embodiments of the invention is discussed. Initially, one or more rendering requests are received which include one or more calls to render anti-aliased text, at 502. Anti-aliasing is a technique known by those of ordinary skill in the art to smooth the appearance of edges of text, lines, shapes, and other geometries as they are presented on a display. Anti-aliasing techniques generally utilize gray scale, and sub-pixel anti-aliasing such as ClearType® from Microsoft Corporation®, among other anti-aliasing techniques.

Figure 6:
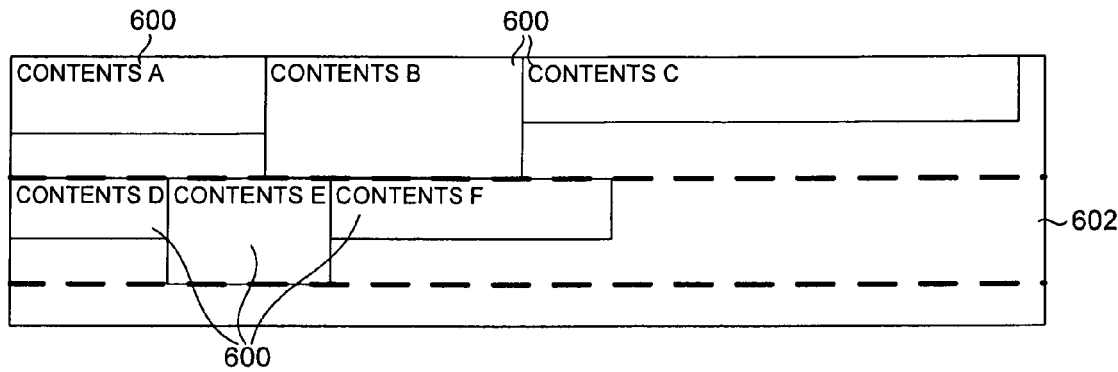
FIG. 6 is an illustrative drawing depicting a staging texture according to embodiments of the invention.

The calls to render anti-aliased text are stored in a staging buffer, at 504. A staging texture is provided at 506, and rectangular portions of the staging texture are allocated to the content of each text rendering call by a heap manager associated with the staging texture. The heap manager operates to allocate the rectangular portions and to insure that the portions do not overlap. The portions might abut along edges to conserve space in the staging texture. Alternatively, the content of each text rendering call may be segmented and the rectangular portions may be allocated for the segments. As depicted in FIG. 6, the rectangular portions 600 of a staging texture 602 are aligned in rows in an X direction. The rows are then offset in a Y direction by the greatest Y extent of the portions in a row. Those of skill in the art will recognize other ways to sub-divide a staging texture into smaller shapes or fields, all of which are within the scope of this disclosure.

The content of the text rendering calls are drawn into their respective rectangular portions, at 510. The staging texture is communicated to a parallel queue, at 512. The parallel queue sits parallel to the intermediate buffer and provides a location for batching staging operations for text rendering calls. The staging operations for preparing and anti-aliasing the text content are known in the art and are not discussed in detail herein, however such is not intended to describe the handling and batching of staging operations as described herein as being known in the art. In embodiments, a text stage manager holds a dynamic array of operations for each stage of the preparation of the text content. Thereby, the text stage manager sorts and consolidates the staging operations for one or more staging textures in the parallel queue by application states that the staging operation may require and by drawing calls, rather than by the order in which the staging operations were communicated to the parallel queue. By sorting and consolidating these operations, the text stage manager provides increased performance in processing and rendering of anti-aliased text.

Staging operations are completed on the content of the staging texture as a batch to prepare the content for blending into a render target, at 514. Calls for blending the content of each text rendering call into a render target are created or are supplied with the request to render anti-aliased text and are communicated to an intermediate buffer, at 516. The data stored in both the intermediate buffer and the parallel queue is communicated for processing by a GPU via a 3-D API, at 518. The content of the parallel queue and intermediate buffer are processed, at 518, by rendering the parallel queue content to a render target and blending the rendered content with one or more graphics generated by processing drawing calls in the intermediate buffer. In an embodiment, logical operations stored in the parallel queue are decomposed into other rendering calls which are sent to the GPU for processing. Thereby, the rendered content can be presented on a display device. In an embodiment, the blending calls stored in the intermediate buffer may be ordered such that the content of the parallel queue is rendered to the render target prior to executing the blending calls.

Figure 7:
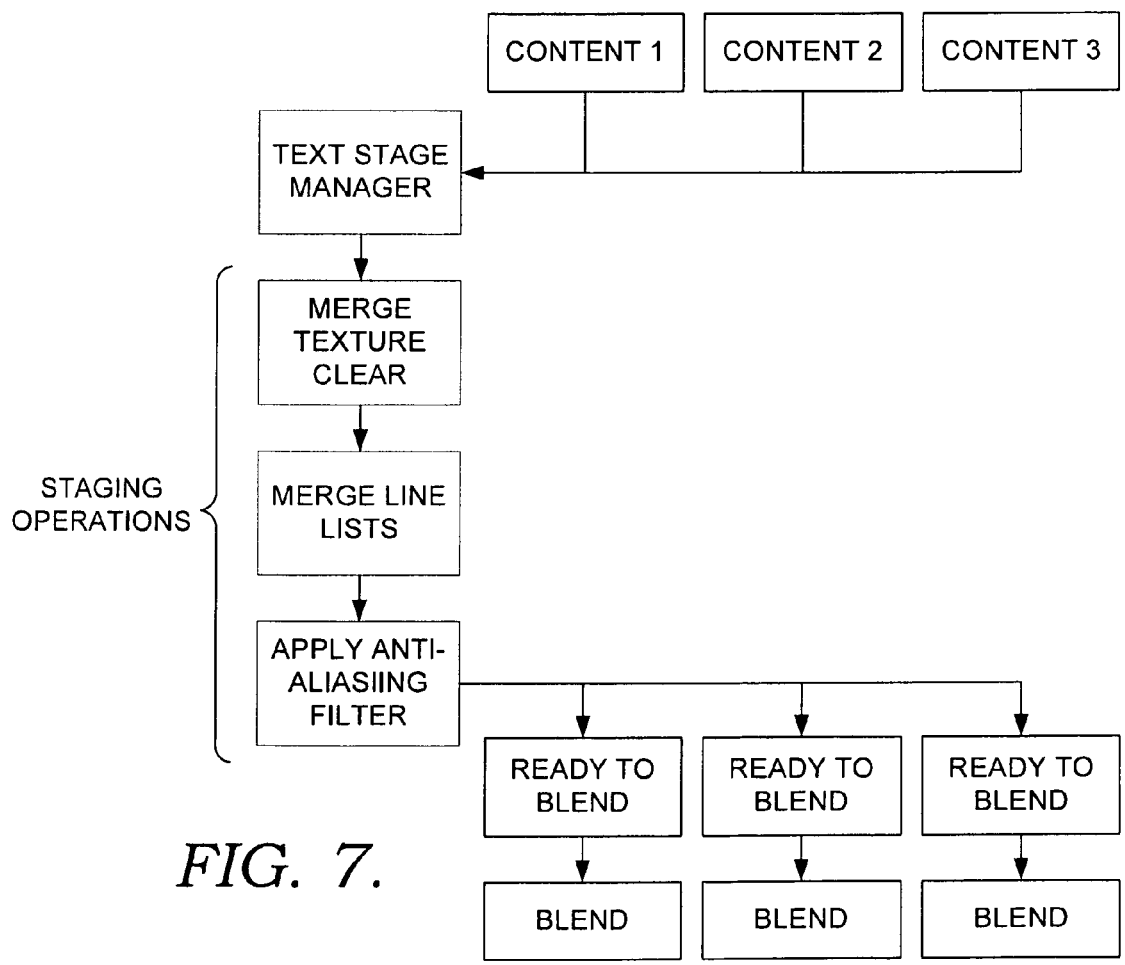
FIG. 7 is a flow diagram depicting processing of staging operations in batch according to embodiments of the invention.
Figure 8:
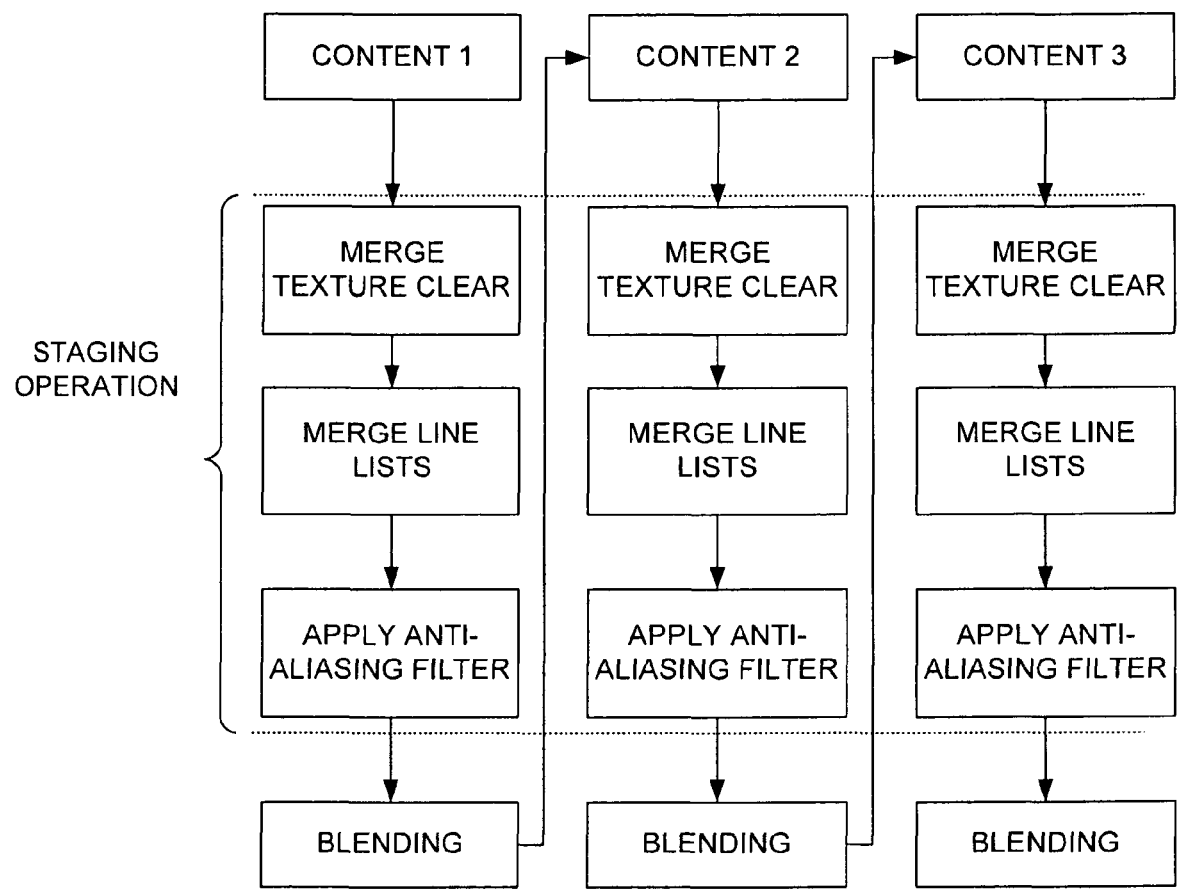
FIG. 8 is a flow diagram depicting processing of staging operations according to the methods of the prior art.
Figure 9:
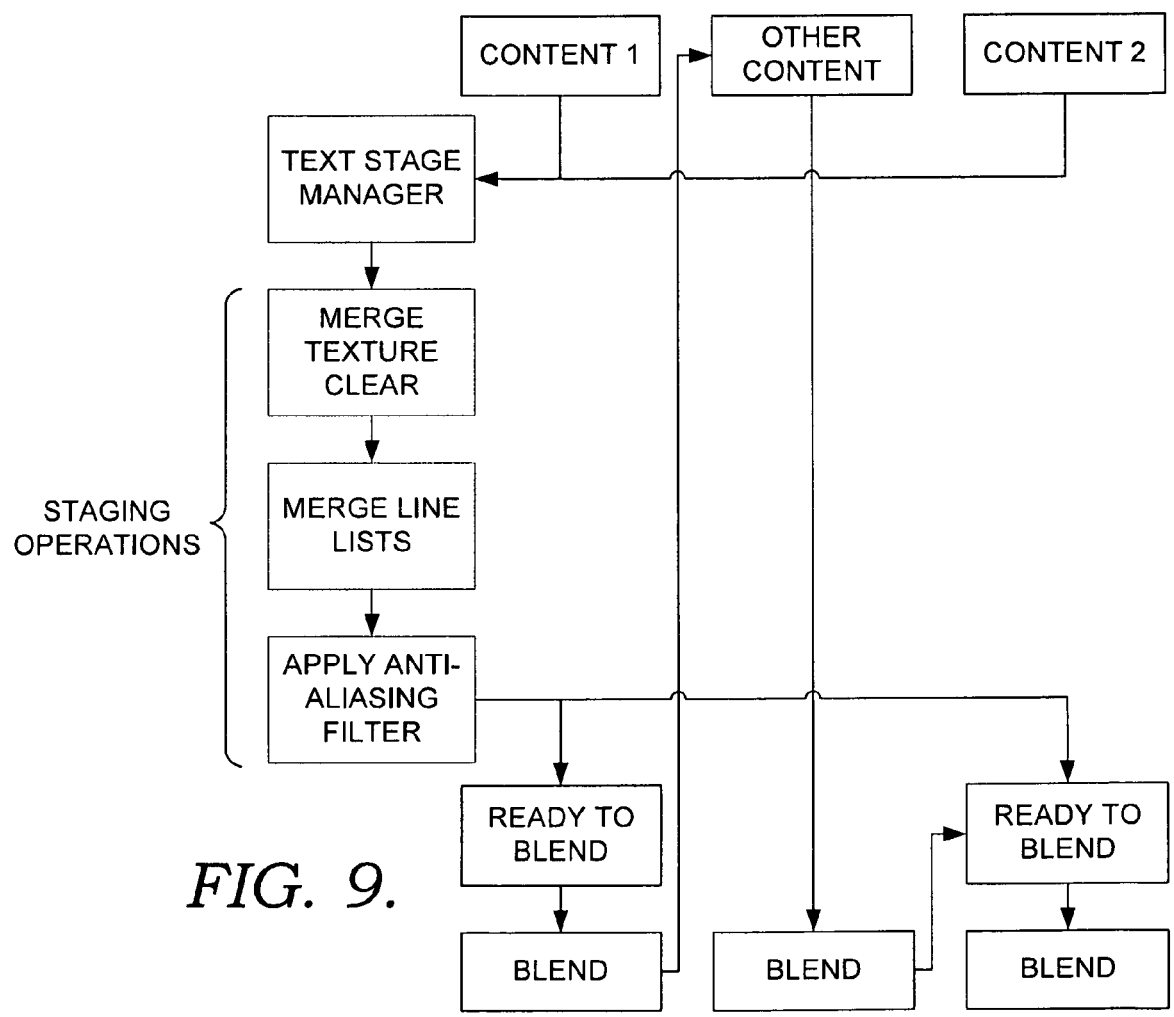
FIG. 9 is a flow diagram depicting processing of staging operations intermixed with processing of other content according to embodiments of the invention.

By preparing the text content in batch, the staging operations only need to be completed once per batch. Thus, great performance gains in speed of processing and in overall processing power usage may be achieved. For example, where a rendering request contains calls for rendering many short, anti-aliased text segments, the segments are prepared as a batch requiring only one cycle of the staging operations as depicted in FIG. 7. Conversely, if the text rendering calls were not batched, then the staging operations would be repeated for each text segment, thereby requiring increased processing and rendering time and using more processing power (such a process is known in the art and is depicted in FIG. 8). Further, by preparing the text content for blending and retaining the blending calls until a later time, the text can be rendered intermixed with other content, as depicted in FIG. 9.

Figure 10:
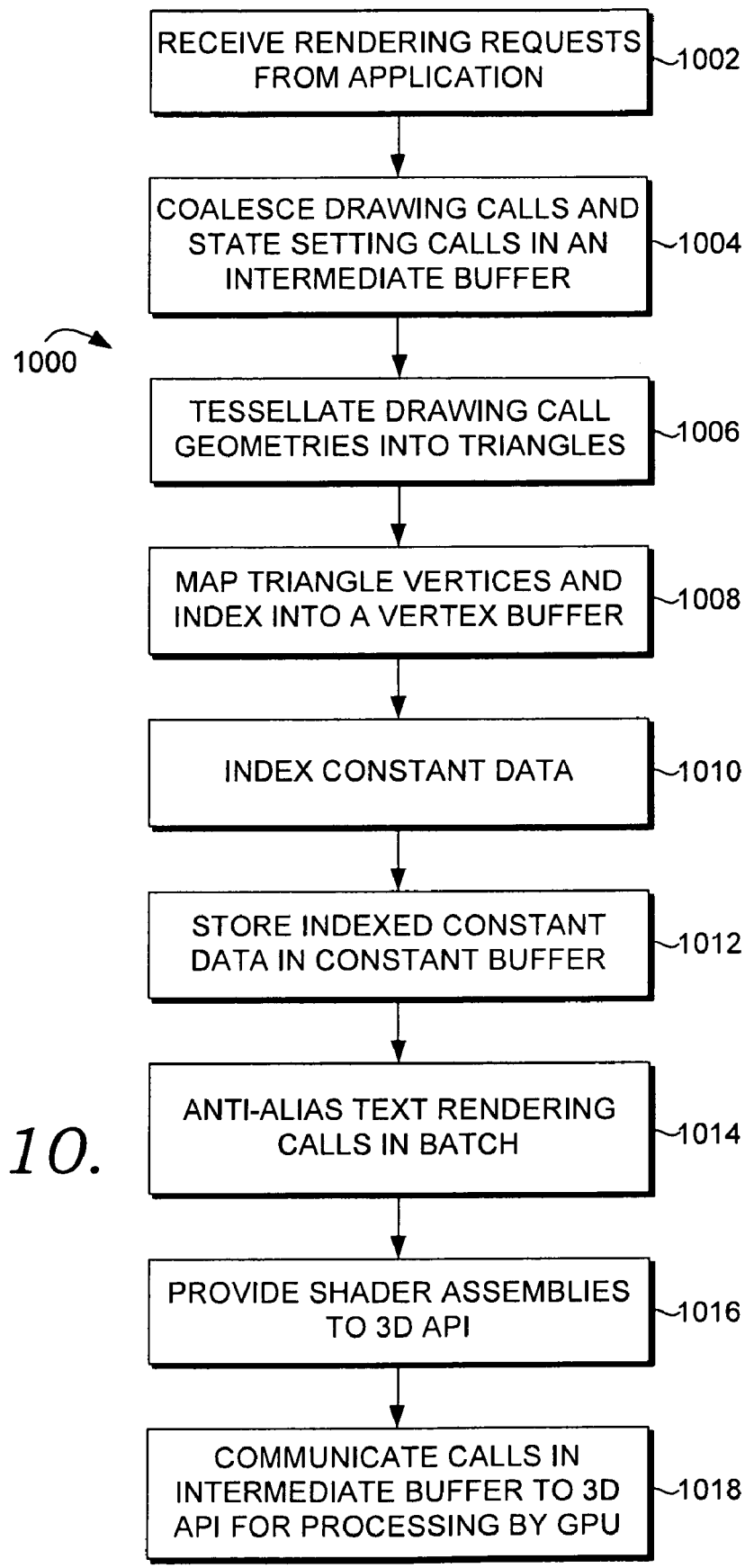
FIG. 10 is a flow diagram depicting a method of displaying two-dimensional objects on a display device according to an embodiment of the invention.

With reference now to FIG. 10, a flow diagram depicting a method 1000 of displaying two-dimensional objects on a display device according to embodiments of the invention is discussed. A set of rendering requests are received at a 2D API from an application, at 1002. One or more drawing calls and state setting calls of the rendering requests are coalesced in an intermediate buffer, at 1004.

At 1006, one or more geometries of the drawing calls are tessellated into triangles, as described above. The vertices of the triangles are mapped into a vertex buffer along with an index to identify constant data stored in a constant buffer for each vertex, at 1008. The constant data is indexed, at 1010 to enable association with the mapped data in the vertex buffer. The indexed constant data are stored in the constant buffer, at 1012, and two or more constant data may be appended together.

The text content (also referred to as "glyphs") for the one or more text rendering calls is anti-aliased in one or more batches, also as described above, through the use of staging textures, a staging buffer, and a parallel queue, at 1014. One or more blending calls may be added to the intermediate buffer to cause blending of rendered text content with other rendered content at a render target upon processing of the one or more text rendering calls.

Shader assemblies are provided to a 3-D API for generation of one or more vertex shaders and pixel shaders, at 1016. Shaders are well know by those of ordinary skill in the art and are defined generally as computer programs executed on a GPU. Shaders can compute any fills, transformations, or other operations for each vertex or pixel for processing the calls of the rendering request. In embodiments, all permutations of shader fragments (e.g., elements of shaders that may be combined to create a shader) that might be used for a rendering request are precompiled in High Level Shader Language ("HLSL"). The precompiled shader fragments are then compressed and stored in computer memory, such as in a dynamic link library. Each of the shader fragments is given an indicia that is recorded in a lookup table, such as a hash-table, which is useable to identify and locate shader fragments for extraction and creation of shaders.

In embodiments, in order to extract the shader fragments a description of a required shader may be obtained by analyzing the rendering calls. A unique key can be constructed from the description and the appropriate shader fragments identified and located using the lookup table. For example, in an embodiment, assume the numeral "1" indicates a solid color and the numeral "2" indicates an anti-aliasing text filter. The key "12" would indicate a combination of shader fragments for rendering solid colored, anti-aliased text.

The shader fragments are extracted from memory and are communicated to the 3-D API. The shaders have already been compiled to an intermediate byte code, thus a compilation step for converting HLSL can be omitted. The device driver, such as device driver 222 further translates the intermediate byte code to GPU specific instructions, which are processed by the GPU to execute the shader operations. Performance gains can be achieved as a result of precompiling the shader fragments, which reduces the number of steps required to generate shaders for use by the GPU. In particular, the expensive step of converting HLSL to intermediate byte code need not be performed during rendering.

The drawing calls and state setting calls stored in the intermediate buffer are communicated for processing by a GPU via a 3-D API. The product of the 2-D rendering requests is thereby rendered at the render target, at 1018. The vertex buffer, constant buffer, parallel queue, and the uncompressed pixel and vertex shaders may also be used by the 3-D API and the GPU for executing the rendering processes.

Through the use of the GPU to process rendering requests and the performance advances provided by: batching rendering calls in an intermediate buffer, batching vertices in a vertex buffer, coalescing draw and state setting calls, indexing constant data in a constant buffer, precompiling shader fragments, and batching text staging operations as described above, an application's rendering requests may be processed much more quickly and efficiently than previously available in the art. Renderings achieving cinematographic performance (e.g., 60 frames per second) may be provided to 2-D applications. Further, CPU usage for graphics rendering may be decreased, thereby increasing the availability of the CPU's processing power to process other system functions.

In embodiments, the invention utilizes a GPU to process rendering requests received from a 2-D application. Where a GPU is not available to provide such processing, fallback to software processing is available. Processing by software may utilize processes similar to those described above, but rather than communicating the calls in an intermediate buffer to a 3-D rendering API for processing by a GPU, the calls in the intermediate buffer may be processed by a CPU and rasterized to a software buffer. The software buffer content may then be copied to a display device for presentation or may be stored for use by another rendering operation, among other uses.

Additionally, embodiments of the invention are classified as immediate mode. Immediate mode may be described as processing the rendering requests and rendering directly to a render target. Conversely, non-immediate mode, or retained mode, may be described as processing the rendering requests and outputting the entire scene to a buffer or secondary target prior to rendering to a final render target or display.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. One or more computer readable tangible storage media having computer-executable instructions embodied thereon for performing a method of displaying two-dimensional objects on a display device, the method comprising:
   receiving a rendering request from an application, wherein said rendering request includes a plurality of drawing calls and a plurality of state setting calls that will be used to draw a two-dimensional drawing that includes a set of primitive geometries ("geometries"), which is made of more complex geometries and less complex geometries, wherein the more complex geometries are more complex than the less complex geometries, and further wherein the more complex geometries are able to be broken down into one or more less complex geometries;
   coalescing the plurality of drawing calls and state setting calls in an intermediate buffer associated with a render target;
   tessellating the set of primitive geometries into a set of triangles by breaking down at least a portion of the relatively more complex geometries into a sequence of corresponding triangles;
   mapping the sequence of corresponding triangles into a vertex buffer, thereby producing mapped data,
   wherein the sequence of corresponding triangles are mapped to the vertex buffer as vertices, and
   wherein an index is associated with each vertex of said vertices, thereby enabling constant data in a constant buffer to be identified;
   indexing said constant data to derive indexed constant data;
   storing said indexed constant data in an indexed constant buffer;
   communicating a plurality of calls in the intermediate buffer to a graphics processing unit via a three-dimensional rendering application program interface ("3-D rendering API"); and
   processing the plurality of calls in the intermediate buffer using the mapped data and constant buffer, thereby displaying said two-dimensional drawing on said display device.

2. The computer readable tangible storage media of claim 1, wherein a single drawing command operates to render the mapped data.

3. The computer readable tangible storage media of claim 2, wherein a single blend mode and a single input texture are used to render the mapped data.

4. The computer readable tangible storage media of claim 1, wherein a plurality of rendering requests are rendered at a rate of at least 60 frames per second.

5. The computer readable tangible storage media of claim 1, wherein said communication is done in batch.

6. The computer readable tangible storage media of claim 1, wherein the rendering requests are rendered in an immediate mode.

7. The computer readable tangible storage media of claim 1, wherein the mapped data is communicated upon occurrence of one or more of: the vertex buffer is full, a flush command is received, and all data for the rendering requests has been mapped to the vertex buffer.

8. The computer readable tangible storage media of claim 1, wherein the frequency of map and unmap calls to the vertex buffer is reduced.

9. The computer readable tangible storage media of claim 1, further comprising:
   querying a computing device for available graphics processing units;
   determining that no graphics processing units are available for processing the rendering requests; and
   processing the plurality of calls in the intermediate buffer in batch via one or more of a software program and a central processing unit.

10. The computer readable tangible storage media of claim 1, further comprising:
   providing one or more shader assemblies to the 3-D rendering API, thereby generating one or more vertex shaders and one or more pixel shaders.

11. The computer readable tangible storage media of claim 1, wherein processing the one or more drawing calls and state setting calls in batch decreases the frequency of render target changes of the 3-D rendering API.

12. The computer readable tangible storage media of claim 1, wherein processing one or more drawing calls and state setting calls from the intermediate buffer decreases an amount of memory access time required to process the rendering requests.

13. The computer readable tangible storage media of claim 1, wherein the batch of one or more drawing calls and state setting calls is not communicated until the occurrence of one or more of: the intermediate buffer is full, a flush command is received, or all rendering requests for rendering at the render target are in the buffer.

14. The computer readable tangible storage media of claim 1, wherein the one or more drawing calls and state setting calls direct rendering to more than one render target, and wherein a different intermediate buffer is associated with each of the more than one render targets, the one or more drawing calls and state setting calls are stored in their respective intermediate buffer, and the contents of each intermediate buffer are communicated separately in batch to the 3-D rendering API.

15. One or more computer readable tangible storage media having computer-executable instructions embodied thereon for performing a method of displaying two-dimensional objects on a display device, the method comprising:
   receiving a plurality of rendering requests from an application, wherein said rendering requests include a plurality of drawing calls, one or more state setting calls, and one or more text rendering calls that will be used to draw one or more two-dimensional drawings that include a set of primitive geometries ("geometries"), which is made of more complex geometries and less complex geometries, wherein the more complex geometries are more complex than the less complex geometries, and further wherein the more complex geometries are able to be broken down into one or more less complex geometries;

coalescing a plurality of drawing calls and state setting calls in an intermediate buffer associated with a render target;
tessellating the set of primitive geometries into a set of triangles by breaking down at least a portion of the relatively more complex geometries into a sequence of corresponding triangles;
mapping the sequence of corresponding triangles into a vertex buffer, thereby producing mapped data,
wherein the sequence of corresponding triangles are mapped to the vertex buffer as vertices, and
wherein an index is associated with each vertex of said vertices, thereby enabling constant data in a constant buffer to be identified;
indexing said constant data to derive indexed constant data;
storing said indexed constant data in an indexed constant buffer;
anti-aliasing the content of the plurality of text rendering calls in batch, wherein calls to blend the text are added to the intermediate buffer, and one or more staging textures containing the anti-aliased text are mapped to a parallel queue;
providing one or more shader assemblies to a three-dimensional rendering application program interface ("3-D rendering API"), thereby generating one or more vertex shaders and one or more pixel shaders; and
communicating a plurality of calls in the intermediate buffer to a graphics processing unit ("GPU") via the 3-D rendering API, wherein the said plurality of calls are processed using the vertex buffer, constant buffer, parallel queue, and one or more vertex shaders and pixel shaders, thereby rendering the said product of two-dimensional rendering requests at said render target.

16. The computer readable tangible storage media of claim 15, further comprising precompiling one or more shader assemblies by:
identifying a plurality of permutations of shader fragments that can be used in the rendering process;
compiling each of the plurality of shader fragments;
compressing the shader fragments; and
storing the shader fragments in a dynamic link library.

17. The computer readable tangible storage media of claim 15, wherein the one or more shader assemblies are referenced by way of a predetermined lookup table.

18. The computer readable tangible storage media of claim 15, wherein the precomputed lookup table is a hash-table.

* * * * *